April 30, 1929. A. G. DE NORTHALL 1,710,970
SAW
Original Filed Sept. 2, 1925 6 Sheets-Sheet 1

April 30, 1929.  A. G. DE NORTHALL  1,710,970
SAW
Original Filed Sept. 2, 1925  6 Sheets-Sheet 3

April 30, 1929.  A. G. DE NORTHALL  1,710,970
SAW
Original Filed Sept. 2, 1925   6 Sheets-Sheet 6

INVENTOR
A. G. de Northall
BY William + Iron
ATTORNEYS

Patented Apr. 30, 1929.

1,710,970

UNITED STATES PATENT OFFICE.

ADRIAN G. DE NORTHALL, OF INDIANAPOLIS, INDIANA.

SAW.

Application filed September 2, 1925, Serial No. 54,098. Renewed July 12, 1928.

This invention relates to power driven saws, and particularly to a portable power driven saw adapted to be used in the felling of trees and in the cutting up of the same, although it is, of course, capable of use for other purposes. The invention may be considered to be in the nature of an improvement on the type of saw described in my United States Patent No. 1,553,672, issued September 15, 1925.

The general object of the invention is to provide a new and improved power driven saw of the kind above mentioned, which will be simple in construction and efficient in operation. To this end, the sawing mechanism hereinafter described, broadly speaking, is characterized by a sawing element composed of a plurality of separate tooth sections which are arranged abutting one another end-to-end and capable of lateral angular movement relatively to one another in planes substantially at right angles to the plane of the saw-cut producible thereby and are guided and driven in an endless path by suitable means.

The invention and the advantages thereof will be understood from the following description of a preferred embodiment thereof which is shown in the accompanying drawings, in which—

Figure 1:
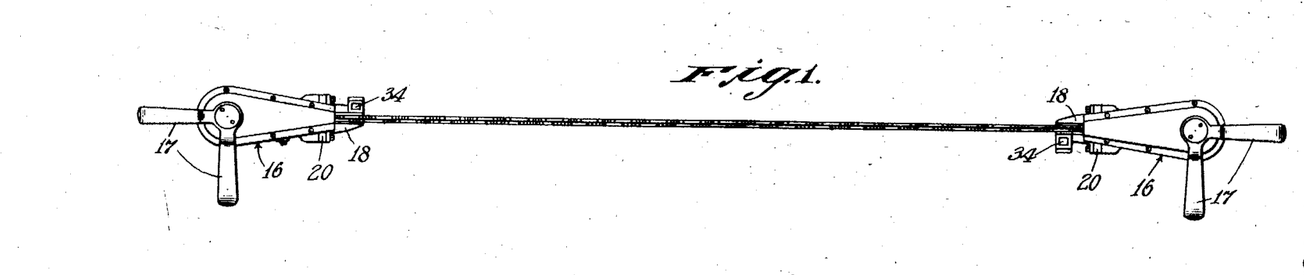
Figure 1 is a plan view of a saw embodying the invention.
Figures 2, 3:
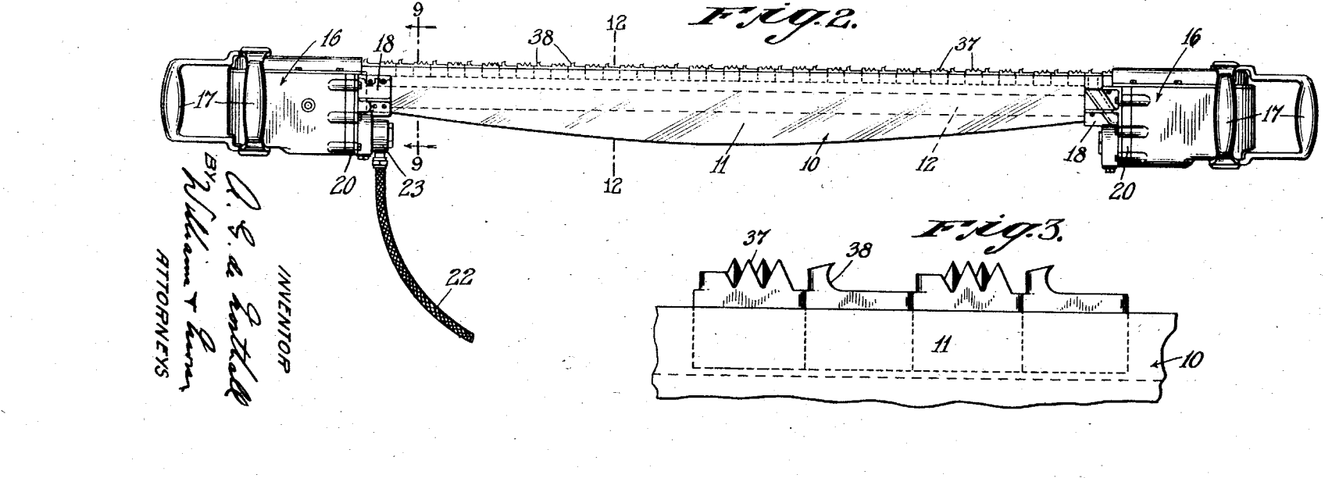
Figure 2 is a side elevation thereof.
Figure 3 is a fragmentary side elevation, on an enlarged scale, of several saw tooth sections cooperating with the guide bar in which they travel.
Figure 12:
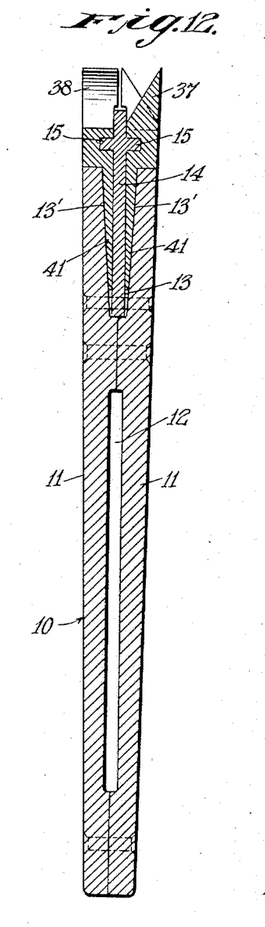
Figure 12 is a sectional elevation, on an enlarged scale on the line 12—12 of Figure 2.
Figure 13:
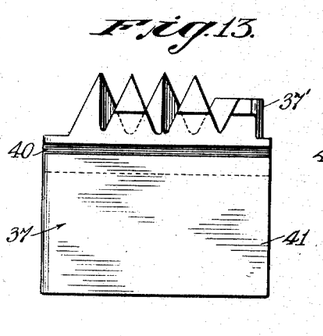
Figure 13 is a side elevation of a form of cutting tooth section adapted to be used in the saw mechanism.
Figure 14:
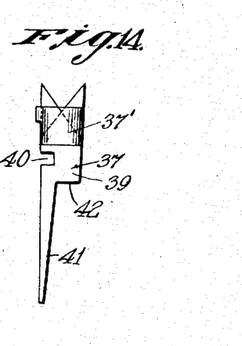
Figure 14 is an elevation of one end thereof.

Referring to the drawings, and particularly to Figures 2 and 12 a guide bar 10 is shown as comprising a pair of side members 11, the inner or abutting faces of which may be recessed to provide an air duct or passage 12 leading from one end of the saw to the other. The side members are riveted or otherwise secured together, as by brazing, and are tapered or relieved transversely of themselves, thus providing a sufficient clearance to enable the guide bar to easily pass through the material being sawed with but little friction and the least possibility of binding in the kerf. A groove 13 is formed along one edge of the guide bar by cutting away or relieving the side members 11, the groove being somewhat tapered and adapted for the reception of a separator 14 which is secured in position by means of rivets, as shown in Figure 12, and provided with flanges 15. The separator 14 is arranged longitudinally of the guide bar and divides the groove 13 into a pair of channels 13' which are also slightly tapered. These channels 13' are adapted for the reception of a sawing element made up of a plurality of separate toothed sections, hereinafter more particularly described, which are arranged in an end-to-end relation and are adapted to be driven in an endless path by suitable means, such as electric or other motors, air motors being herein illustrated and later more particularly described.

Figure 11:
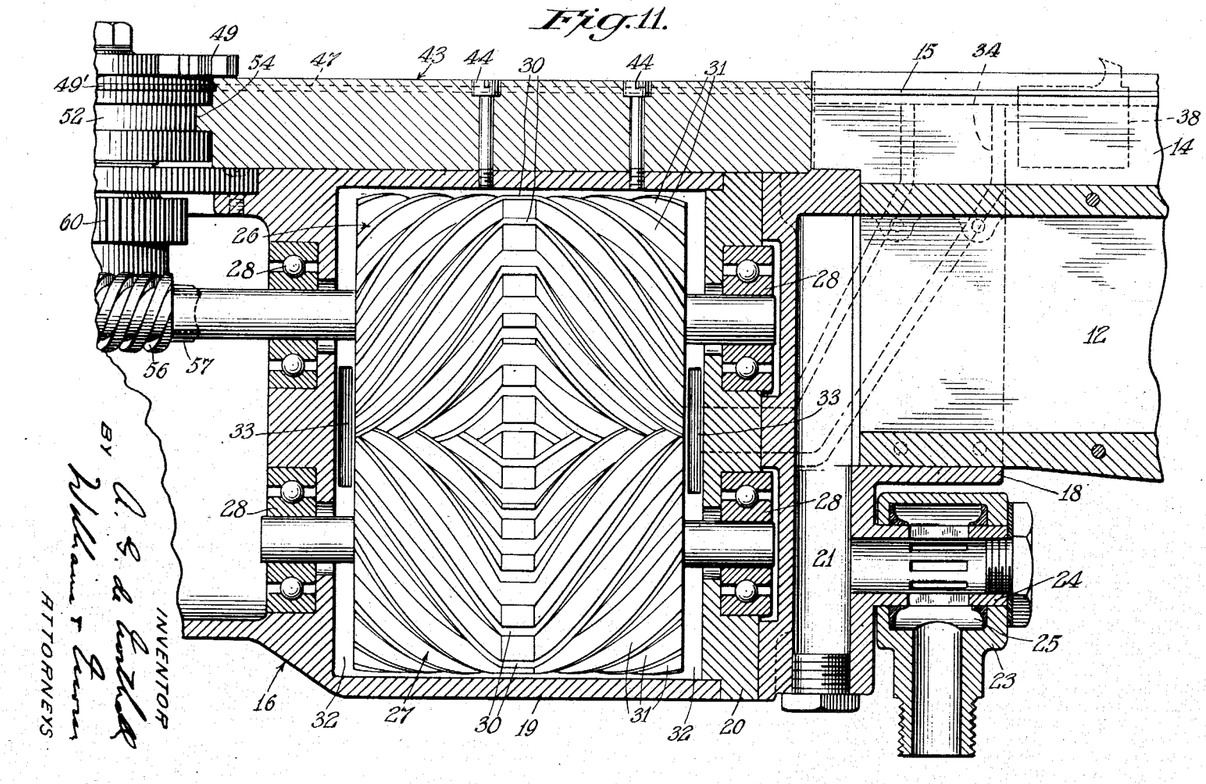
Figure 11 is a fragmentary sectional elevation through one end of the saw mechanism.

As shown in Figure 2, to each end of the guide bar 10, is secured a housing 16, these housings being provided with handles 17 which are preferably adjustable about their point of pivotal connection with the housing in order to facilitate manipulation of the saw. Each of the housings comprises a head 18 which is adapted to be suitably connected to the guide bar 10, the head being secured to a motor casing 19 by means of lag bolts which pass through a bearing plate 20 arranged intermediate the head 18 and the casing 19. The heads 18 are cored to provide air passages 21 which are adapted to communicate with the air duct or passage 12 formed in the guide bar 10, one of the passages 21 constituting an inlet for compressed air which may be derived from a suitable source and transmitted to the passage 21 by means of a hose 22 which is connected to a rotatable head 23 journaled upon a hollow boss 24, the head 23 being provided with an annular channel 25 and the boss 24 being slotted, as shown in Figure 11, in order to maintain unrestricted communication between the passage 21 and the air line or hose 22 regardless of the position assumed by the head 23.

Within each casing 19, is arranged an air motor comprising a pair of rotors 26 and 27, the shafts of which are journaled preferably in ball bearings 28. The rotors 26 and 27 are of conventional design, in a well known type of air motor, and are provided with intermeshing gear teeth 30 from which extend intermeshing convolute ribs 31. In the type of air motor shown, the supply of compressed air is admitted in the vicinity of the intermeshing gear teeth 30 and is thereafter, while acting upon the rotors, directed towards opposite ends of the rotors. The rotors are spaced at their ends from the end walls of the motor casing to provide chambers 32 which are adapted to receive the air as it is released from the rotors and are maintained in communication with exhaust ports 33 leading to an exhaust passage 34, the passage 34 being extended through the bearing plate 20 and the head 18 and terminating in an exhaust outlet which is so shaped as to direct the exhausted air on to the toothed sections hereinafter more particularly described. Owing to the expansion of the air, which is released from the motors, a refrigerated zone is set up in the vicinity of the exhaust outlets at the outer ends of the passages 34 and as the toothed sections pass through these refrigerated zones they are subjected to a cooling action which is highly desirable in a saw of the type to which this invention is directed, inasmuch as the toothed sections are driven at a high rate of speed measured in linear feet per minute. The theory as to the refrigerating characteristics produced by the escaping exhaust is based upon observations made in connection with tests of the saw herein shown, during which tests it was noted that the toothed sections after use of the saw were considerably cooler at the completion of the sawing operation than at the start, despite the fact that the toothed sections were driven at a high rate of speed. Not only is the escaping exhaust utilized as a refrigerating medium, as explained, but it is also utilized to remove from the toothed sections particles of wood, in the nature of saw dust and small chips, which tend to adhere to the exposed surfaces of the toothed sections during the sawing operation.

In order to provide communication between the air motors and the air passage or duct 12, which communicates with the air passage 21, the casings 19 are cored to provide inlet passages 35 similar to the passages 34 hereinbefore described. The passages 35 communicate with ports 36 which are so located that the air entering the motors is directed to the rotors 26 and 27 in the vicinity of their intermeshing teeth 30.

Inasmuch as the air duct 12 communicates with the air passage 21 and with the inlet passages 35 formed in both of the casings 19, it will be appreciated that a single air supply connection, such as the hose 22 and its associated parts hereinbefore described, is sufficient to effect delivery of air to both of the motors.

Figure 15:
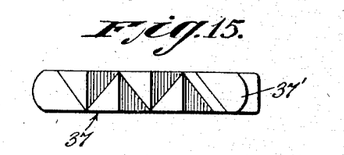
Figure 15 is a plan view thereof.
Figure 16:
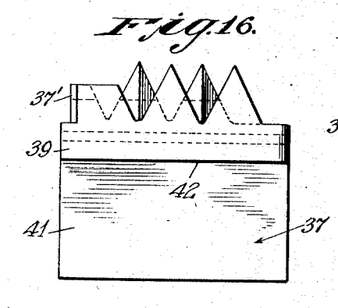
Figure 16 is a side elevation of the side of said tooth section opposite that shown in Figure 13.
Figure 17:
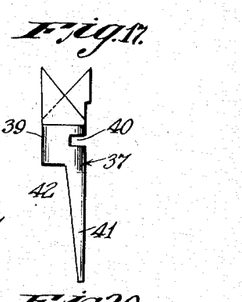
Figure 17 is an end elevation thereof opposite to the end shown in Figure 14.
Figure 18:
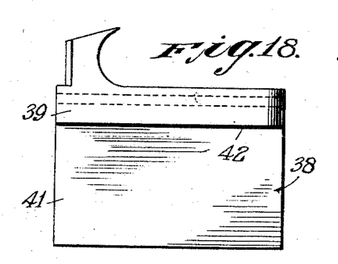
Figures 18, 19, 20 and 21 are side, end and plan views of a form of rake tooth section adapted to be used in the saw mechanism.
Figure 19:
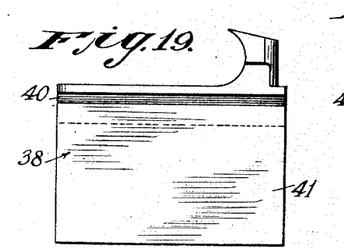
Figure 20:
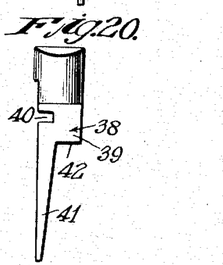
Figure 21:
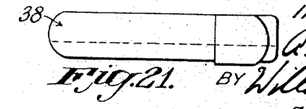

The sawing element which is adapted to traverse the grooved edge of the guide bar comprises a plurality of separate toothed sections 37 and 38. Each of the sections 37 carries a plurality of cutting teeth, shown in detail in Figures 13 to 17 and each of the sections 38 carries a rake tooth, shown in detail in Figures 18 to 21. The teeth of the sections 38 are adapted to be engaged by the teeth of suitable driving sprockets, hereinafter more particularly described, which are employed to drive the sawing element in an endless path, the faces of the teeth with which the sprocket teeth contact being rounded as shown most clearly in Figure 21. The sections 37 are provided with lugs 37', and these lugs, like the teeth of the sections 38, are round as shown most clearly in Figure 15, to provide curved faces with which the teeth of the sprockets are adapted to contact. The sections 37 and 38 are arranged alternately abutting one another end-to-end and are capable of lateral angular movement relatively to each other in planes substantially at right angles to the plane of the cut producible by said saw sections thereby forming a continuous sawing element, portions of which are contiguous and are adapted to travel in opposite directions within the channels 13' upon opposite sides of the separator 14. By reason of this arrangement, any thrusts exerted by the sawing element upon the saw mechanism longitudinally of the guide bar 10 and in opposite directions are neutralized so that the saw may be easily handled and manipulated regardless of the speed at which the sawing element is operated.

Each of the toothed sections comprises a head 39 formed with a retaining portion or groove 40, the head being provided with a guiding portion or fin 41 which forms with the head a shoulder or bearing portion 42. This seating surface is adapted to ride upon the edges of the side members 11 adjacent the tapered channels 13' into which the fins 41, which are tapered to conform to the channels 13' are adapted to snugly fit. It will be understood that the flanges 15 and fins 41, fitting respectively into the grooves 40 and channels 13', serve to prevent the sections from becoming transversely displaced with respect to the guide bar.

Figure 4:
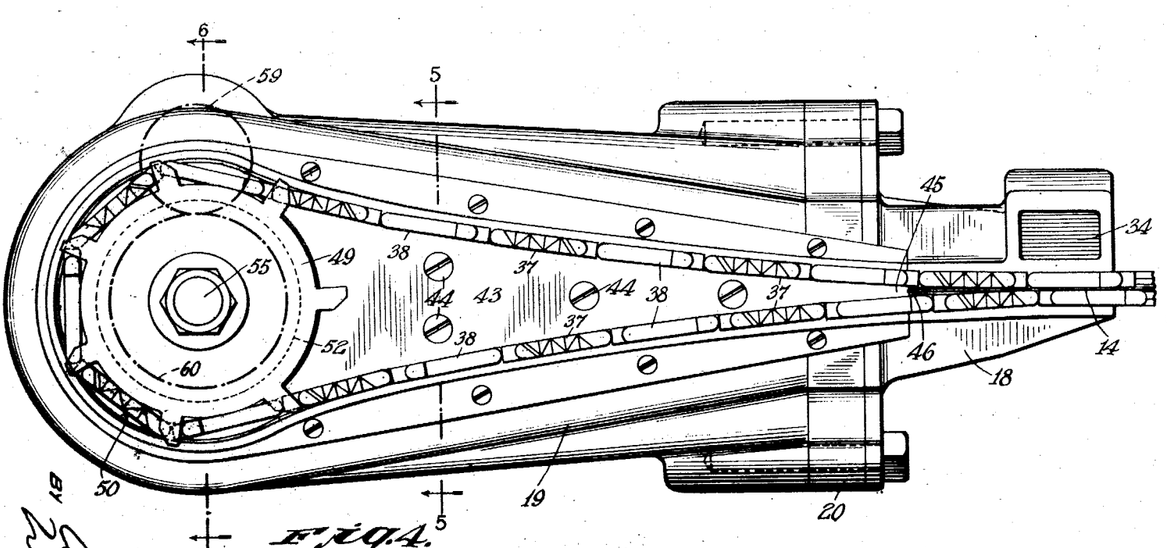
Figure 4 is a plan view of one end of the saw, with the cover plate removed so as to show a portion of the internal mechanism.
Figure 5:
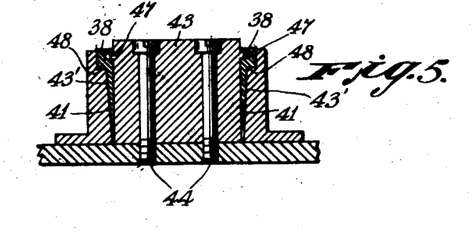
Figure 5 is a fragmentary sectional elevation on the line 5—5 of Figure 4.
Figure 6:
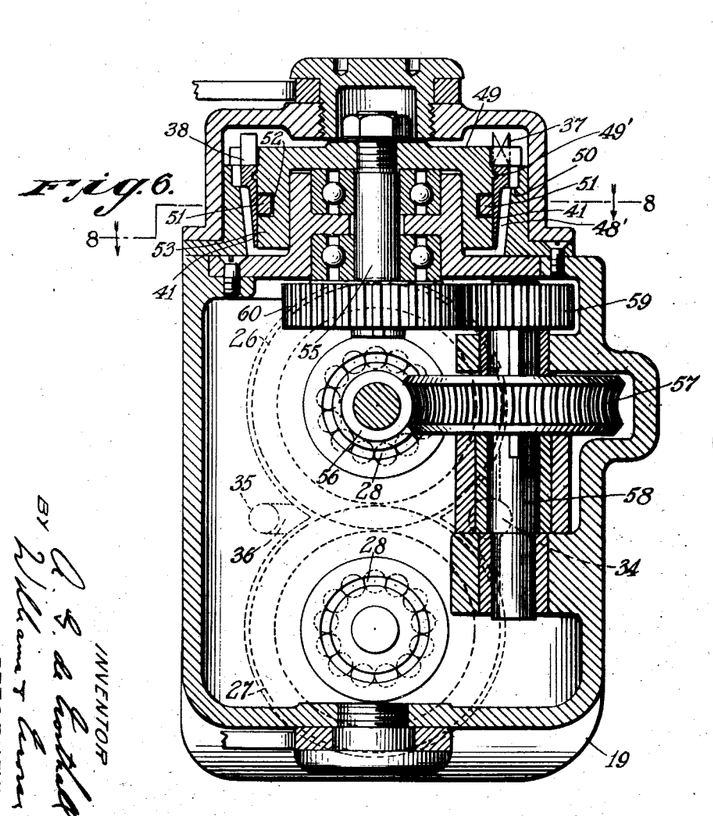
Figure 6 is a sectional elevation on the line 6—6 of Figure 4, the cover being shown but a portion of the handle being omitted.
Figure 7:
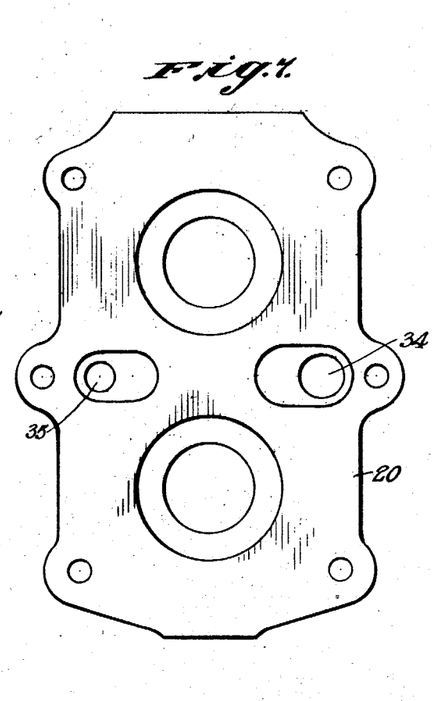
Figure 7 is a plan view of a plate forming one end of the motor housing.
Figure 8:
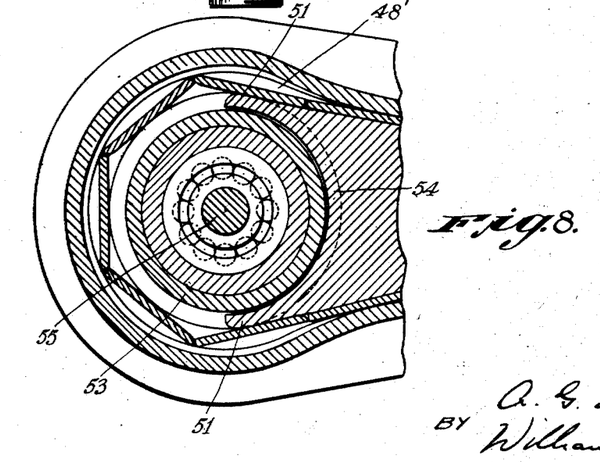
Figure 8 is a fragmentary sectional plan view on the line 8—8 of Figure 6.
Figure 9:
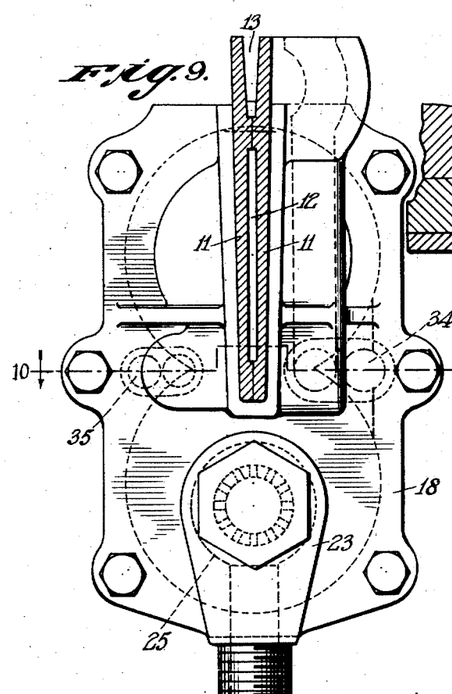
Figure 9 is a sectional elevation on the line 9—9 of Figure 2, showing only the end of the casing to which the guide bars is attached.
Figure 10:
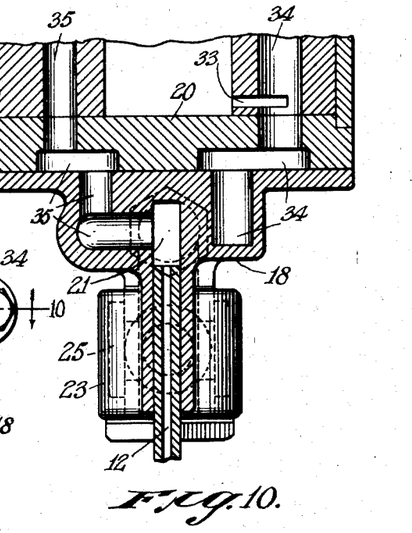
Figure 10 is a fragmentary plan view on the line 10—10 of Figure 9.

In order to facilitate looping of the sawing element about the driving sprockets, hereinafter more particularly described, at each end of the saw, it becomes necessary to divert the toothed sections from their straight line course along the guide bar 10, and to this end frog plates 43 are provided. These frog plates are secured to the housings 16 by means of lag screws 44 and are each tapered on a gradual curve from one end to a feather edge 45 at the other, the feather edges being provided with grooves or indentures, as shown at 46 in Figure 4, adapted for the reception of opposite ends of the separator 14. The frogs 43 form with the housings 16, channels 43' which constitute continuations of the channels 13' located on opposite sides of the separator 14 and are somewhat wider than the latter named channels in order to permit the toothed sections to travel freely along the curved course without binding as will be readily understood. The frogs 43, like the separators 14, are provided on opposite sides with flanges 47 with which the flanges 15 of the separator abut and blend. The flanges 47 are received by the grooves 40 of the toothed sections and serve to prevent the sections from becoming dislodged. The housing 16 is recessed adjacent the channels 43', thus providing ledges 48 which constitute continuations of the edges of the side members 11, the toothed sections being adapted to ride from the edges of the side members 11 on to the ledges 48 in traveling from one end of the saw to the other. The curved channels 43', which the frogs 43 form with the housing 16, blend into curved channels or passages 48' which partially encircle sprockets 49 located at the wider ends of the frogs 43. The channels 48' are materially wider than the grooves 43', the increased width being necessary due to the fact that sufficient clearance must be provided between the sprockets and the housings to accommodate the toothed sections as they pass around the axes of the sprockets in a tangential relation to the sprockets, as shown in Figure 4. The channels 48' which are formed intermediate the sprockets 49 and the housings 16 like the channels 43' at opposite sides of the frogs 43, are tapered so that opposite ends of the fins 41 are in contact with the walls of the housings 16 throughout the depth of the fins. By reason of the contacts thus afforded, engagement of the toothed sections with the teeth of the sprockets is maintained while the toothed sections are passing around the looped paths. By referring to Figure 6, it will be noted that the housings 16 adjacent the sprockets are recessed thus providing ledges 50 which blend with the ledges 48. It is upon the ledges 50 that the outer corners of the toothed sections are adapted to ride as the toothed sections are moved about the axes of the sprockets. Inasmuch as the teeth of the sprockets overlap abutting ends of the toothed sections when these sections are transferred from the ledges 48 to the ledges 50, the toothed sections are prevented from becoming dislodged or displaced longitudinally of the axes of the sprockets. If desired however, displacement of the toothed sections longitudinally of the axes of the sprockets 49 can be further insured against by providing the sprockets with annular ribs 49' which are received by the grooves 40 of the toothed sections and constitute continuations of the flanges 47.

In order to facilitate transfer of the sections from the sprockets to the channels 43', intermediate the frogs 43 and housings 16, the frogs are, at their wider ends, provided with fingers 51 which are rounded at their ends and project into annular grooves 52 formed in the flanged portions 53 of the sprockets. These fingers constitute continuations of beads 54 formed integral with the wider ends of the frogs adjacent the sprockets, which beads also project into the grooves 52.

The sprockets 49, which are connected to their respective drive shafts 55, are operatively connected to their respective motors through a train of reduction gearing comprising a worm 56 connected to the rotor 26, the worm 56 in turn meshing with a worm gear 57 keyed to a shaft 58 to which is secured a pinion 59 meshing with a larger pinion 60 carried by the drive shaft 55.

In operation, compressed air is admitted through the flexible hose 22 to the air passage 21 from which it passes into the air duct or passage 12. This air duct communicates at opposite ends with inlet passages formed in the motor casings 19 and consequently the air admitted to the duct 12 is directed, by way of the inlet ports 36, to the rotors 26 and 27 in the vicinity of their intermeshing gear teeth 30, thereby effecting simultaneous operation of the motors. The air which is admitted to the motors is directed towards opposite ends of the rotors 26 and 27 and is exhausted into the ports 33. These ports communicate with the passages 34 which terminate in outlets that are so shaped as to direct the exhausted air on to the toothed sections for the purpose of cooling the teeth and removing therefrom small particles of wood or sawdust. The air supply may, of course, be controlled by means of a suitable valve, not shown, to start and stop the motors. Inasmuch as the motors are operatively connected to the sprockets 49 and since the teeth of these sprockets are adapted to engage the lugs 37' of the sections 37 and the teeth of the sections 38, the sawing element composed of a plurality of these sections arranged in an end-to-end and abutting relation is driven in its endless path. The contiguous portions of the cutting element operating within the channels 13' are driven in opposite directions and by reason of this opposed operation any thrust which is exerted upon the saw mechanism longitudinally of the sawing element by one contiguous portion is neutralized by a corresponding thrust exerted in an opposite direction by the other contiguous portion. Due to this neutralization of longitudinal thrusts in opposite directions, the saw may be easily handled and manipulated regardless of the speed at which the cutting element is operated.

While I have shown and described one embodiment of my invention, it will become apparent that various modifications may be made in many respects without departing from the spirit of the invention as defined in the claims hereto appended.

What I claim is:—

1. In a cutting device, a cutting element composed of a plurality of disconnected toothed sections arranged abutting one another end-to-end and capable of lateral angular movement relatively to each other in planes substantially at right angles to the plane of the cut producible thereby, means for guiding said toothed sections in a defined endless path, and means for driving said toothed sections in their path of movement.

2. In a sawing device, a sawing element composed of a plurality of disconnected toothed sections arranged abutting one another end-to-end and capable of lateral angular movement relatively to each other in planes substantially at right angles to the saw-cut producible thereby, means for guiding said toothed sections in an endless path including two cutting portions contiguous to one another, and means for driving said toothed sections in their path of movement.

3. In a sawing device, a sawing element composed of a plurality of disconnected toothed sections arranged abutting one another end-to-end, and capable of lateral angular movement relatively to each other in planes substantially at right angles to the saw-cut producible thereby, means for guiding said toothed sections in an endless path including two cutting portions contiguous to one another, and means cooperating with the toothed sections of the sawing element outside of the portions of their path which lie contiguous to one another for driving said toothed sections in their path of movement.

4. In a sawing device, a sawing element composed of a plurality of disconnected toothed sections arranged abutting one another end-to-end and capable of lateral angular movement relatively to each other in planes substantially at right angles to the saw-cut producible thereby, means for guiding said toothed sections in an endless path including loops and two straight cutting portions contiguous to one another, and means cooperating with the toothed sections in the looped portions of their path for driving said toothed sections in their path of movement.

5. In a sawing device, a sawing element composed of a plurality of disconnected toothed sections arranged abutting one another end-to-end and capable of lateral angular movement relatively to each other in planes substantially at right angles to the saw-cut producible thereby, means for guiding said toothed sections in an endless path including a guide bar in which the toothed sections move contiguous to one another in opposite directions in the same saw-cut, frames at each end of said guide bar in which said toothed sections move in loop-shaped paths in planes substantially at right angles to the saw-cut, and means cooperating with said toothed sections while they are passing through said loop-shaped paths for driving them in their path of movement.

6. In a sawing device, a guide bar having a grooved edge, a separator in said grooved edge forming two channels, a sawing element composed of a plurality of disconnected toothed sections arranged abutting one another end-to-end and capable of lateral angular movement relatively to each other in said channels in planes substantially at right angles to the saw-cut producible by said device, and means for driving said toothed sections through said channels in opposite directions.

7. In a sawing device, a sawing element having contiguous portions and composed of a plurality of disconnected toothed sections arranged abutting one another end-to-end and capable of lateral angular movement relatively to each other in planes substantially at right angles to the saw-cut producible thereby, means for guiding said toothed sections in an endless path, and means for exerting independent driving thrusts in opposite directions upon the contiguous portions of the sawing element.

8. In a sawing device, a sawing element having contiguous portions and composed of a plurality of disconnected toothed sections arranged abutting one another end-to-end and capable of lateral angular movement relatively to each other in planes substantially at right angles to the saw-cut producible thereby, means for guiding said toothed sections in an endless path, and driving sprockets at opposite ends of said endless path for exerting independent driving thrusts upon said contiguous portions in opposite directions, and means for driving said sprockets.

9. In a sawing device, a sawing element having contiguous portions and composed of a plurality of disconnected toothed sections arranged abutting one another end-to-end and capable of lateral angular movement relatively to each other in planes substantially at right angles to the saw-cut producible thereby, means for guiding said toothed sections in an endless path, driving sprockets at opposite ends of said endless path for exerting independent driving thrusts upon said contiguous portions in opposite directions, and motors operatively connected to said driving sprockets.

10. In a sawing device, a guide bar composed of side members between the corresponding margins of which is formed a groove, a sawing element having contiguous portions adapted to operate within said groove, the sawing element being composed of a plurality of disconnected toothed sections arranged abutting one another end-to-end and capable of lateral angular movement relatively to each other in planes substantially at right angles to the saw-cut producible thereby, means adapted to cooperate with said toothed sections for retaining them within said groove, means at opposite ends of said groove for guiding said toothed sections in looped paths constituting portions of said endless path, and means at the looped ends of the sawing element for driving the toothed sections of said contiguous portions in opposite directions.

11. In a sawing device, a guide bar having a groove in its edge, a separator in said groove dividing the groove into two channels, a sawing element composed of a plurality of disconnected toothed sections arranged abutting one another end-to-end, means for driving said toothed sections through said channels in opposite directions, and means associated with said separator and adapted to cooperate with said toothed sections for retaining the toothed sections within said channels.

12. In a sawing device, a guide bar having a groove in one edge thereof, a sawing element composed of a plurality of disconnected toothed sections arranged abutting one another end-to-end within said groove and clearing the bottom thereof and having shoulders adapted to ride upon the edges of said guide bar, and means for driving said toothed sections through said groove in opposite directions.

13. In a sawing device, a guide bar having a groove formed in one edge thereof, a separator dividing said groove into two channels, a sawing element composed of a plurality of disconnected toothed sections arranged abutting one another end-to-end in said channels and having shoulders and grooves formed in opposite sides thereof, the inner ends of said sections being clear of the bottoms of said channels and the shoulders of said sections being adapted to ride upon the edge of said guide bar and the grooves of said sections being adapted for the reception of portions of said separator, and means for driving said toothed sections through said channels in opposite directions.

14. In a sawing device, a guide bar composed of side members having corresponding margins spaced from each other, a separator arranged within the spaces afforded between corresponding margins of said side members and forming with said side members two parallel channels, a sawing element composed of a plurality of disconnected toothed sections having fins and shoulders, said fins being adapted to project into said channels but clear of the bottom thereof and said shoulders being adapted to ride along the edges of said side members, and means for driving said toothed section along opposite sides of said separator in opposite directions.

15. In a sawing device, a guide bar composed of a pair of side members having their corresponding margins spaced apart, a separator arranged within the space afforded between said corresponding margins and forming with the said side members two channels, a sawing element composed of a plurality of disconnected toothed sections having shoulders and grooves formed upon opposite sides thereof and provided with fins, the fins of the toothed sections being adapted to project into said channels but clear of the bottom thereof and the shoulders of said sections being adapted to ride upon the edges of said side members, means associated with said separator and adapted to project into the grooves of said sections for retaining the sections against displacement transversely of said guide bar, and means for driving the toothed sections at opposite side of said separator in opposite directions.

16. In a sawing device, a guide bar having a duct extending therethrough, a sawing element composed of a plurality of toothed sections arranged end-to-end, means for guiding said toothed sections in an endless path, fluid pressure motors arranged at opposite ends of said guide bar for driving said sawing element in said endless path, said motors being adapted for communication with each other through said duct.

17. In a sawing device, a guide bar composed of side members between which is formed a duct, a sawing element composed of a plurality of toothed sections arranged end-to-end and adapted to operate in an endless path and along an edge of said guide bar, means for guiding said toothed sections in an endless path, fluid motors at opposite ends of said guide bar for driving said sawing element in said endless path and having inlet and outlet passages, some of which passages are common to said duct through which communication between said motors is afforded.

18. In a sawing device, a sawing element adapted to be driven in an endless path, portions of which are curved and portions of which are contiguous to one another, said sawing element comprising a plurality of disconnected toothed sections adapted to traverse said endless path one behind the other, means for guiding said sections along the contiguous portions of said endless path and for retaining the sections during movement along the contiguous portions against lateral movement with respect to each other, means for guiding the toothed sections along the curved portions of said endless path, and means for driving said sawing element in said endless path.

19. For use in a power driven saw, a sawing element adapted to be driven in an endless path and comprising a plurality of disconnected toothed sections arranged abutting one another end-to-end and capable of lateral angular movement relatively to each other and adapted to traverse said endless path one behind the other.

20. For use in a power driven saw, a sawing element adapted to be driven in an endless path, portions of which are curved and portions of which are contiguous to one another, and comprising a plurality of disconnected toothed sections adapted to traverse said endless path one behind the other and to move laterally with respect to each other as they traverse the curved portions of said endless path.

In testimony whereof, I have affixed my signature to this specification.

ADRIAN G. DE NORTHALL.